(12) United States Patent
Fukunaga et al.

(10) Patent No.: US 6,641,169 B2
(45) Date of Patent: Nov. 4, 2003

(54) STRUCTURE FOR ATTACHING MOTORCYCLE FUEL TANK

(75) Inventors: Hirofumi Fukunaga, Saitama (JP); Noriyoshi Tsutsui, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/226,173

(22) Filed: Aug. 23, 2002

(65) Prior Publication Data

US 2003/0075659 A1 Apr. 24, 2003

(30) Foreign Application Priority Data

Aug. 31, 2001 (JP) .......................... 2001-265109

(51) Int. Cl.[7] .............................. B60P 3/22; B62J 11/00
(52) U.S. Cl. ..................... 280/835; 224/413; 280/834
(58) Field of Search ............... 248/309.1; 180/219; 224/413; 280/834, 830, 831, 832, 835

(56) References Cited

U.S. PATENT DOCUMENTS

| | | | | |
|---|---|---|---|---|
| 3,987,294 A | * | 10/1976 | Carlson | 362/101 |
| 4,449,723 A | * | 5/1984 | Shiratsuchi | 280/833 |
| 4,469,190 A | * | 9/1984 | Yamaguchi | 180/219 |
| 4,717,163 A | * | 1/1988 | Tsukiji | 280/835 |
| 4,830,134 A | * | 5/1989 | Hashimoto | 180/219 |
| 4,846,499 A | * | 7/1989 | Izumi et al. | 280/830 |
| 5,127,560 A | * | 7/1992 | Miyamoto et al. | 224/413 |
| 5,924,734 A | * | 7/1999 | Fukagawa et al. | 280/830 |
| 5,944,216 A | * | 8/1999 | Inaoka et al. | 220/562 |
| 6,186,550 B1 | * | 2/2001 | Horii et al. | 280/833 |
| 6,213,514 B1 | * | 4/2001 | Natsume et al. | 280/833 |
| 6,237,710 B1 | * | 5/2001 | Mori et al. | 180/219 |
| 6,419,273 B1 | * | 7/2002 | Iizuka et al. | 280/833 |
| 6,478,335 B2 | * | 11/2002 | Reed | 280/835 |

* cited by examiner

Primary Examiner—Leslie A. Braun
Assistant Examiner—Amy J. Sterling
(74) Attorney, Agent, or Firm—Birch, Stewart, Kolasch & Birch, LLP

(57) ABSTRACT

When a fuel tank is supported rotatably, one end side of the fuel tank must be fixed by a lock mechanism. Although the background art engaging structure is simple and convenient, when the lock mechanism cannot be provided due to space limitations, a rotating support structure cannot be employed. An engaging member is provided on the front portion of the fuel tank and is inserted from the rear side to be engaged with a retaining member and to be pulled rearwardly for disengagement. A fuel tank is provided at a rear end thereof with a hinge. A bolt relatively moving in a guide groove formed in a side plate of the hinge is supported on a collar fixed to a seat rail. The hinge is slideable and rotatable.

18 Claims, 7 Drawing Sheets

STRUCTURE FOR ATTACHING MOTORCYCLE FUEL TANK

CROSS-REFERENCE TO RELATED APPLICATIONS

This nonprovisional application claims priority under 35 U.S.C. §119(a) on Patent Application No. 2001-265109 filed in Japan on Aug. 31, 2001, the entirety of which is hereby incorporated by reference.

BACKGROUND OF THE INVENTION

1. Field of the Invention

The present invention relates to a structure for attaching a motorcycle fuel tank. In particular, the present invention relates to a structure for attaching a motorcycle fuel tank in a rotatable manner.

2. Description of Background Art

A known motorcycle fuel tank attaching structure includes a substantially U-shaped engaging member opened toward the front. The engaging member is provided in the front portion of the fuel tank and is inserted into and engaged with a retaining member on a body frame side. An attaching plate protruding to a lower side of the seat is provided at the rear end of the fuel tank. The plate is bolted and fixed to the body frame. The fuel tank is attached to the body frame in the two front and rear portions.

Another known motorcycle fuel tank attaching structure includes a rotatably supported fuel tank. In this case, one end of the fuel tank is attached onto the body frame be a hinge and the other end thereof is provided with a lock mechanism. The lock is unlocked to rotate the fuel tank on the hinge on the body frame.

When a fuel tank is rotatable, the fuel tank does not need to be detached during maintenance. Accordingly the troubles associated with detachment and attachment of the fuel tank are reduced and parts related to detachment and attachment cannot fall and get lost. In view of this, the maintenance is improved correspondingly. However, one end side of the fuel tank must be fixed by a lock mechanism. Although the background art engaging structure is simple and convenient, the lock mechanism cannot be employed in some instances due to space limitations. If the lock mechanism cannot be employed, the rotating support itself cannot be employed.

SUMMARY OF THE INVENTION

An object of the present invention is to employ a background art engaging structure on a side opposite to where the fuel tank is rotatably supported.

To solve the above problems of the background art, according to a first aspect of the present invention, a structure for attaching a motorcycle fuel tank which is fixed to a body frame by a first support part provided in the front portion of the fuel tank and a second support part provided in the rear portion thereof, wherein:

the first support part is of an engaging construction engaging and disengaging the body frame by the front and rear movement of the fuel tank, and the second support part is constructed by a hinge slideable in the front and rear directions and rotatable in the upper and lower directions together with the fuel tank.

According to the first aspect of the present invention, the hinge constructing the second support part is slideable and rotatable to the body frame together with the fuel tank. The fuel tank is slid in the front and rear directions to disengage the first support part. The hinge can be slid to permit the disengaging operation. This can rotate the hinge on the coupling point to the body frame. Accordingly, the fuel tank can be rotated. The fuel tank is fixed in reverse order.

Although the fuel tank is rotatable, the hinge is slideable and rotatable. The first support part can employ the background art engaging structure. The present invention is advantageous when a request employing the background art engaging structure is strong and the provision of a lock mechanism is limited. Furthermore, the support structure is simple and inexpensive.

According to a second aspect of the present invention, the structure for attaching a motorcycle fuel tank further includes a rotating regulation device. The rotating regulation device regulates the rotation of the fuel tank within a predetermined range.

According to the second aspect of the present invention, the rotating regulation device for regulating the rotating amount of the fuel tank is provided. Accordingly, the fuel tank is prevented from being rotated excessively. Furthermore, the piping arranged below the fuel tank is prevented from being affected adversely to facilitate the rotating operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
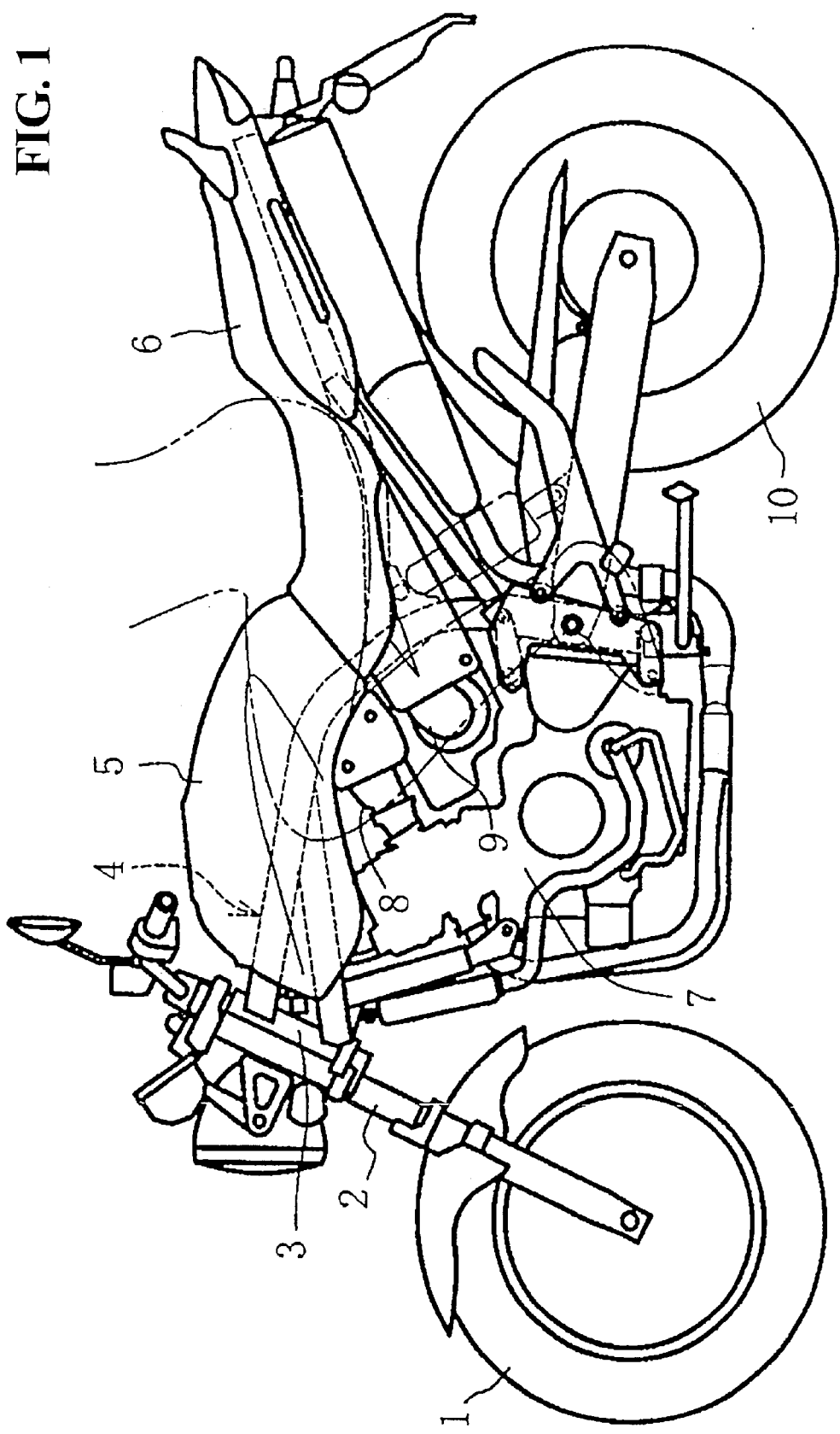
FIG. 1 is a side view of a motorcycle to which the present invention is applied.
Figure 2:
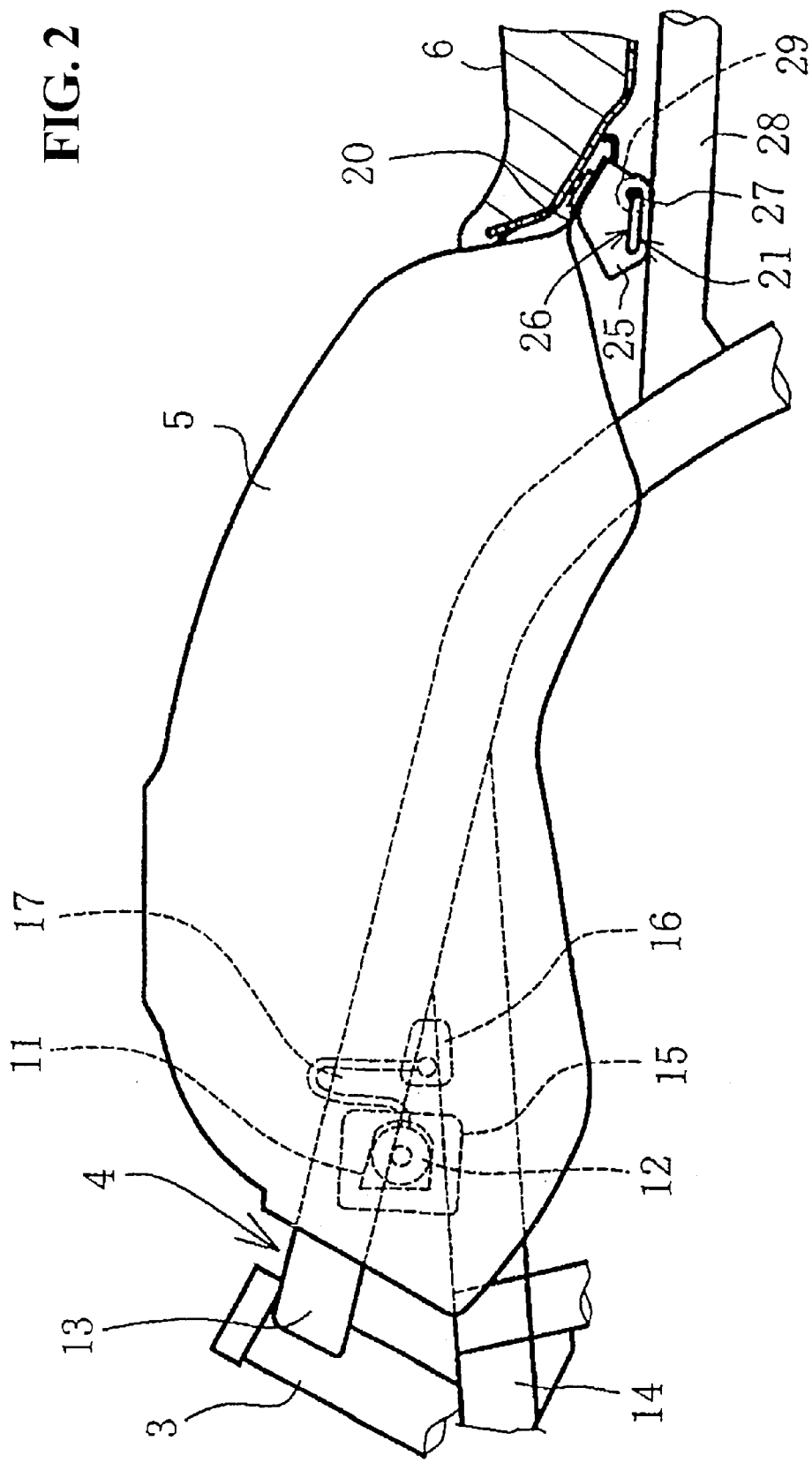
FIG. 2 is a side view of a fuel tank.
Figure 3:
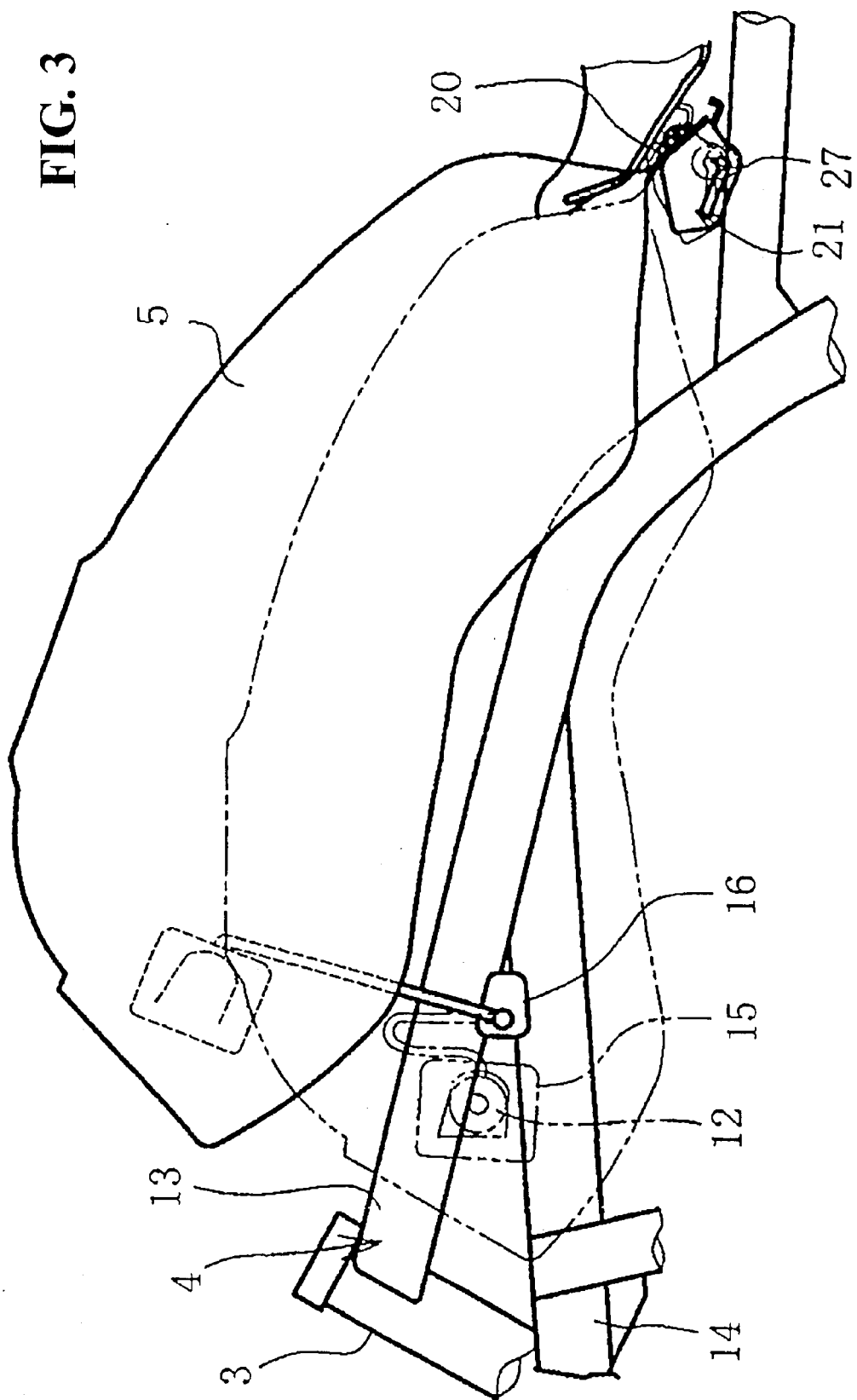
FIG. 3 is a diagram showing the rotating state of the fuel tank.
Figure 4:
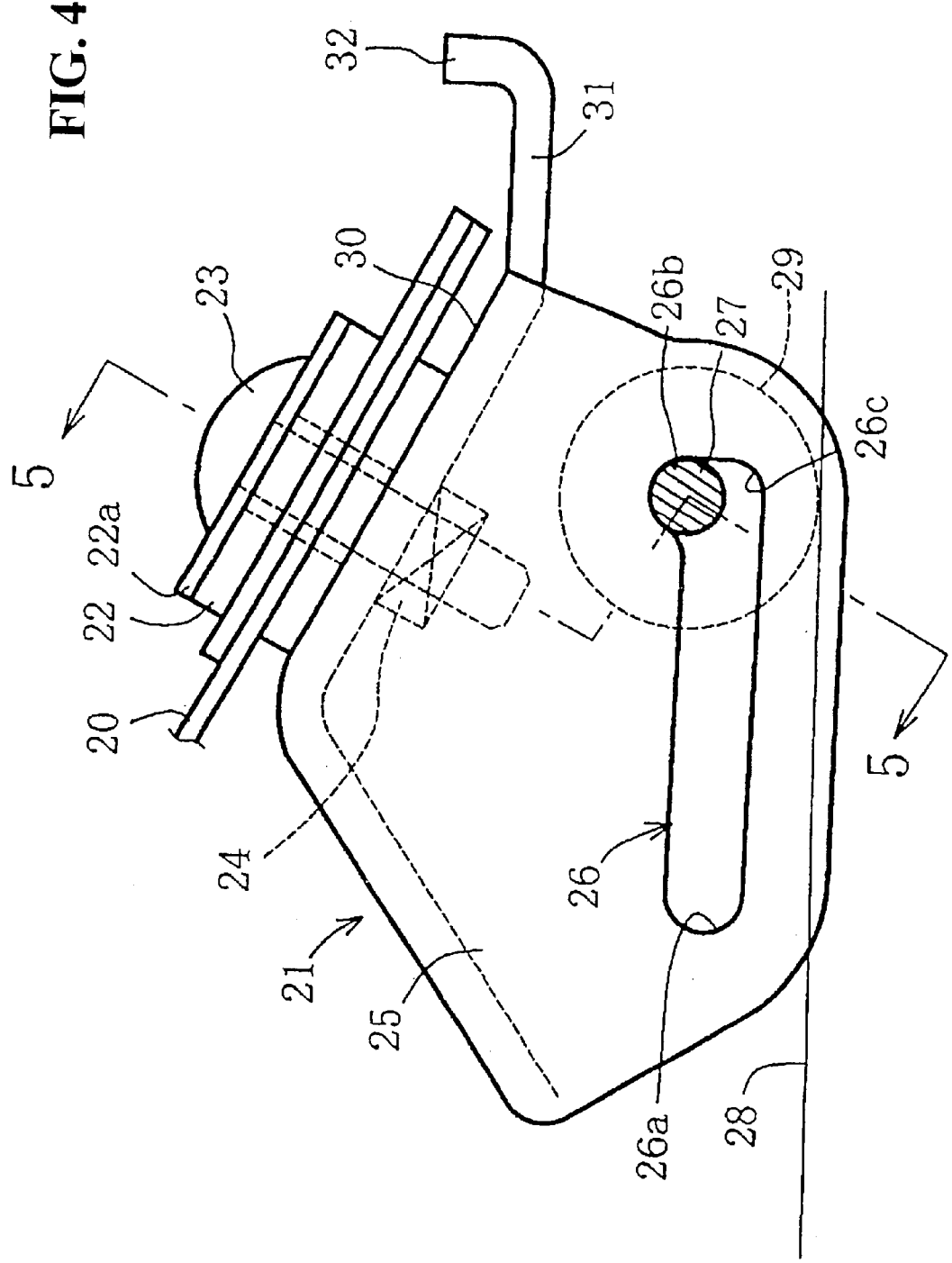
FIG. 4 is an enlarged side view of a hinge.
Figure 5:
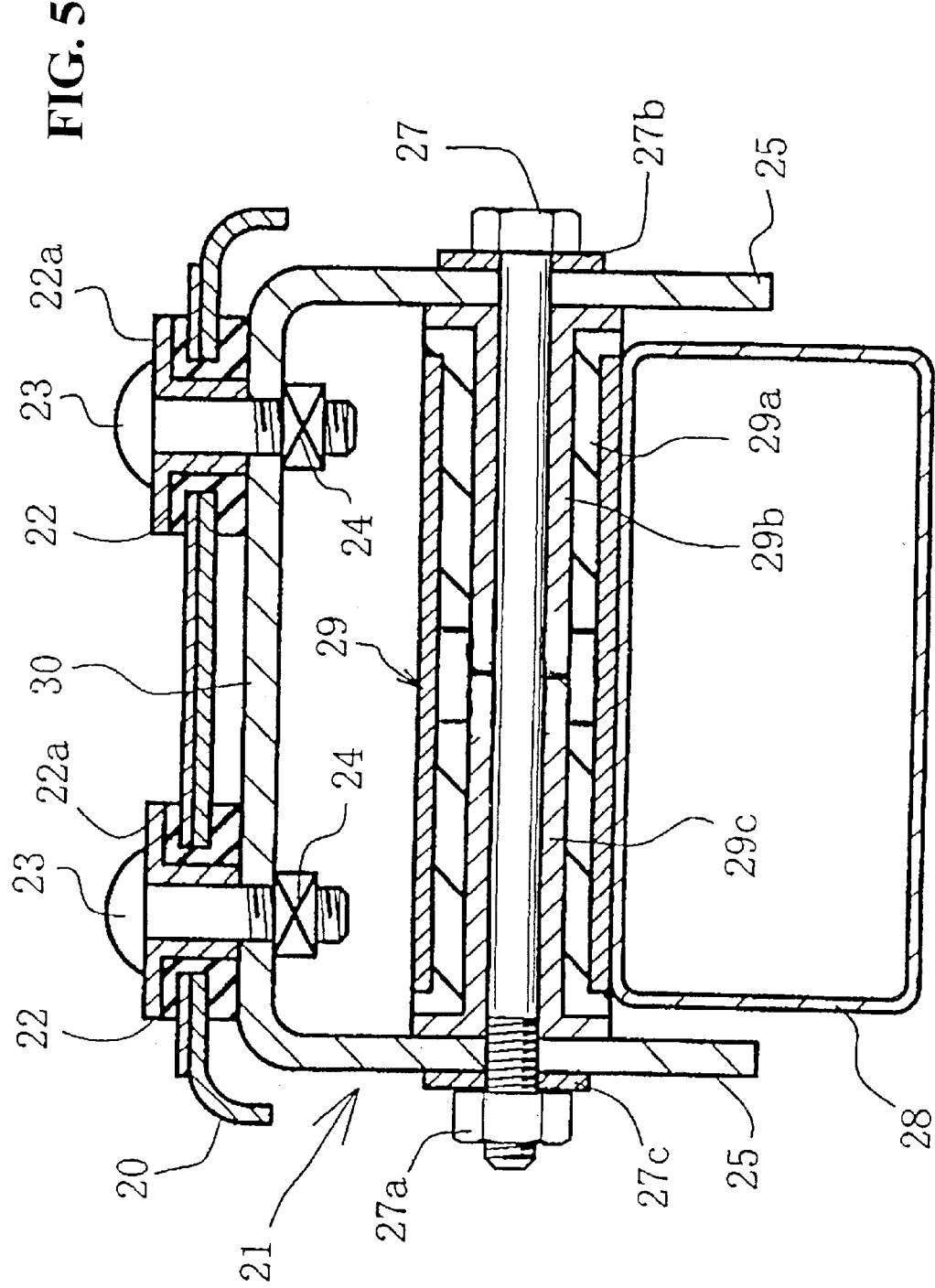
FIG. 5 is a cross-sectional view taken along line 5—5 of FIG. 4.
Figure 6:
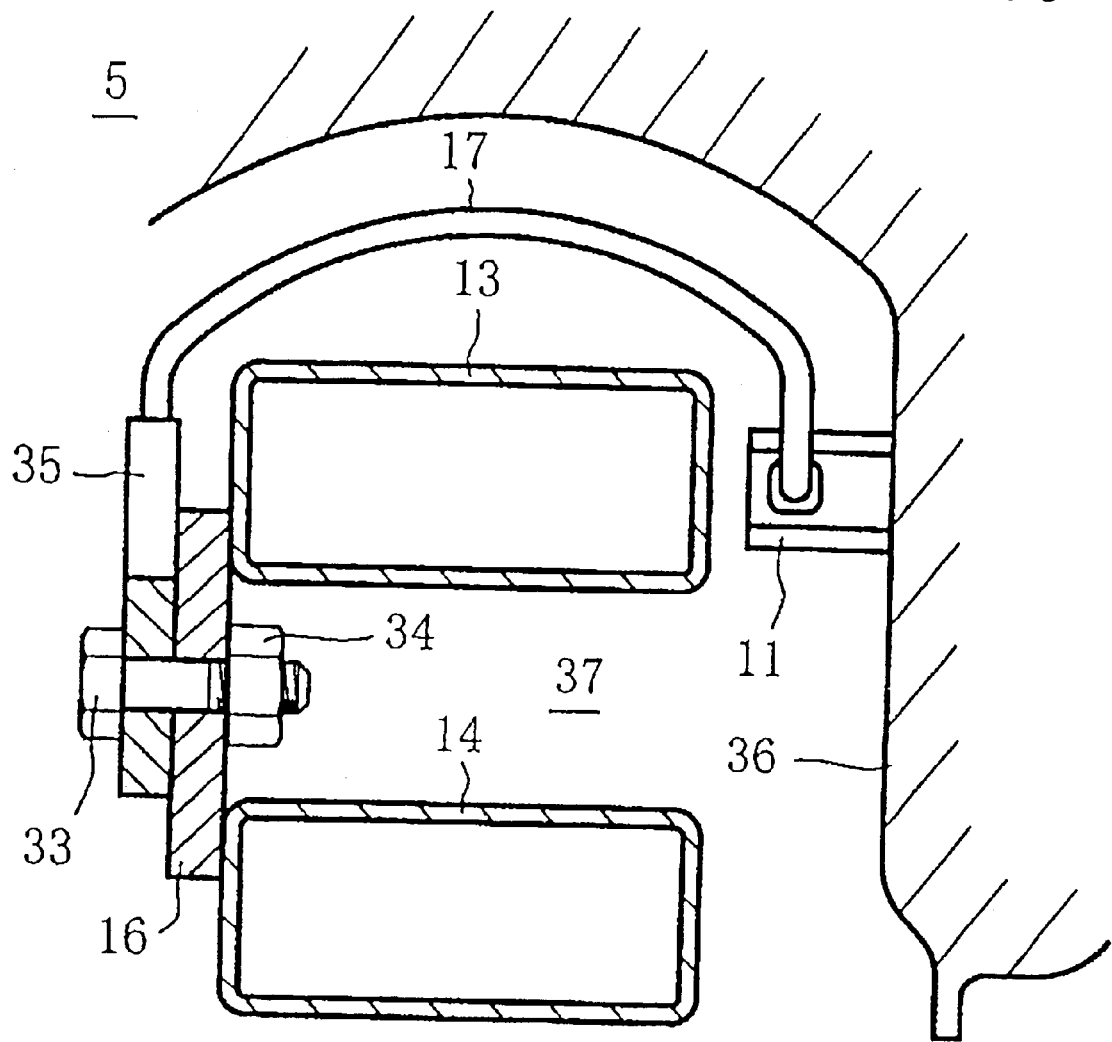
FIG. 6 is a schematic cross-sectional view of the front portion of the fuel tank.

The present invention will now be described with reference to the accompanying drawings. FIG. 1 is a side view of a motorcycle to which present invention is applied. FIG. 2 is a side view of a fuel tank. FIG. 3 is a diagram showing the rotating state of the fuel tank. FIG. 4 is an enlarged side view of a hinge. FIG. 5 is a cross-sectional view taken along line 5—5 of FIG. 4. FIG. 6 is a cross-sectional view of the front portion of the fuel tank. FIG. 7 is an explanatory view of the operation of the hinge.

In FIG. 1, reference numeral 1 identifies a front wheel, reference numeral 2 identifies a front fork, reference numeral 3 identifies a head pipe, reference numeral 4 identifies a body frame of a mono backbone frame type, reference numeral 5 identifies a fuel tank, reference numeral 6 identifies a seat, reference numeral 7 identifies an engine, reference numeral 8 identifies a throttle body of a fuel injector, reference numeral 9 identifies an air cleaner, and reference numeral 10 identifies a rear wheel.

As shown in FIGS. 2 and 3, the fuel tank 5 includes a substantially U-shaped engaging member 11 in a side surface of a front end thereof. The substantially U-shaped engaging member 11 is opened toward the front and can engage and disengage a retaining member 12 provided on the body frame 4 side. The retaining member 12 is provided as a circular part protruding sideward from a plate 15. The plate 15 is attached between the respective side surfaces of a main frame 13 and a sub pipe 14, which is arranged at a lower side of the main frame 13, extending rearwardly and slanting upwardly. The main frame 13 and the sub pipe 14, construct the body frame 4.

The engaging member 11 is slid together with the fuel tank 5 from the rear to the front to be pushed into and engaged with the retaining member 12. The fuel tank 5 is drawn back to the rear to be disengaged and separated from the retaining member 12.

A patch plate 16 is provided rearwardly of the retaining member 12 on the side surface of the body frame 4. A wire cable 17 is coupled between the patch plate 16 and the fuel tank 5. The wire cable 17 regulates the rotating amount of the fuel tank 5 within a fixed range and includes a rotating regulation device. FIG. 3 shows a rotating regulation state of the fuel tank 5. The fuel pump, not shown, is incorporated in the fuel tank. The fuel in the fuel tank is pressure fed to the lower throttle body 8 via a fuel hose, not shown.

The fuel tank 5 is integrally provided at its rear end with an attaching plate 20 protruding downwardly from the seat 6. As shown in FIGS. 4 and 5, the attaching plate 20 is attached to and integrated with a hinge 21 via a rubber member 22 with a bolt 23 and a nut 24. The bolt 23 extends through an integrated collar 22a in the center portion of the rubber member 22.

The hinge 21 has a substantially U-shaped cross-section opening downwardly. Right and left side plates 25 are each formed with guide grooves 26. The hinge 21 is attached to a collar 29 through the guide grooves 26. The collar 29 is welded onto a seat rail 28, which is a portion of the body frame 4. A bolt 27 and a nut 27a act as guide axes for the hinge 21.

The numeral 29a in FIG. 5 denotes a rubber member inserted from the right and left sides into the inside of the collar 29. A pair of flanged collars 29b, 29c inserted from the right and left sides are provided in the inside of the collar 29. The bolt 27 extends through the collars 29b, 29c to floatingly support the hinge 21 to the seat rail 28. The numerals 27b, 27c denote washers.

Each guide groove 26 is a substantially L-shaped groove having a long lateral groove part 26a extending substantially horizontally and a short longitudinal groove part 26b extending upwardly from the rear end of the lateral groove part 26a. The groove width is about the thickness of the axial part of the bolt 27. The length of the longitudinal groove part 26b is about 1.5 times larger than the thickness of the axial part of the bolt 27.

The crossing part of the lateral groove part 26a and the longitudinal groove part 26b forms a corner part 26c. When the fuel tank 5 is fixed onto the body frame 4 and rotated, the bolt 27 is positioned to be brought into contact with the upper end of the longitudinal groove part 26b. The bolt 27 is relatively moved between the lateral groove part 26a and the longitudinal groove part 26b via the corner part 26c.

The hinge 21 is coupled to the attaching plate 20 to be integrated with the fuel tank 5. When the fuel tank 5 is slid in the front and rear directions, the hinge 21 is moved integrally. The bolt 27 fixedly supported on the body frame 4 side via the collar 29 is not moved essentially. The hinge 21 is moved to relatively move the bolt 27 in the lateral groove part 26a.

In the disengaging state where the engaging member 11 is separated from the retaining member 12, the bolt 27 is positioned in the upper end in the longitudinal groove part 26b. The hinge 21 and the fuel tank 5 are rotatable on the bolt 27. When a rear end bent part 32 of a stopper 31, which integrally extends rearwardly from a top plate 30 of the hinge 21, is brought into contact with the seat rail 27, the rotation is limited. The stopper 31 includes the rotating regulation device such as the wire cable 17.

As shown in FIG. 6, the patch plate 16 is welded to the respective side surfaces of the main frame 13 and the sub pipe 14, which are metal pipe members having a four-cornered cross-section. An attaching plate 35 provided at one end of the wire cable 17 is fixed to one end of the patch plate 16 with a bolt 33 and a nut 34.

The other end of the wire cable 17 crosses the main frame 13 to be coupled to the engaging member 11 provided in a side part inner surface 36 of the fuel tank 5 on the opposite side of the main frame 13. The fuel tank 5 crosses the body frame 4 in the right and left directions. The center portion of the fuel tank 5, through which the body frame 4 passes, forms a large space 37. The space 37 can be used to dispose the wire cable 17. The wire cable 17 is arranged crossing from one side of the body frame 4 to the other side thereof to reduce slack during non-use.

Figure 7A:
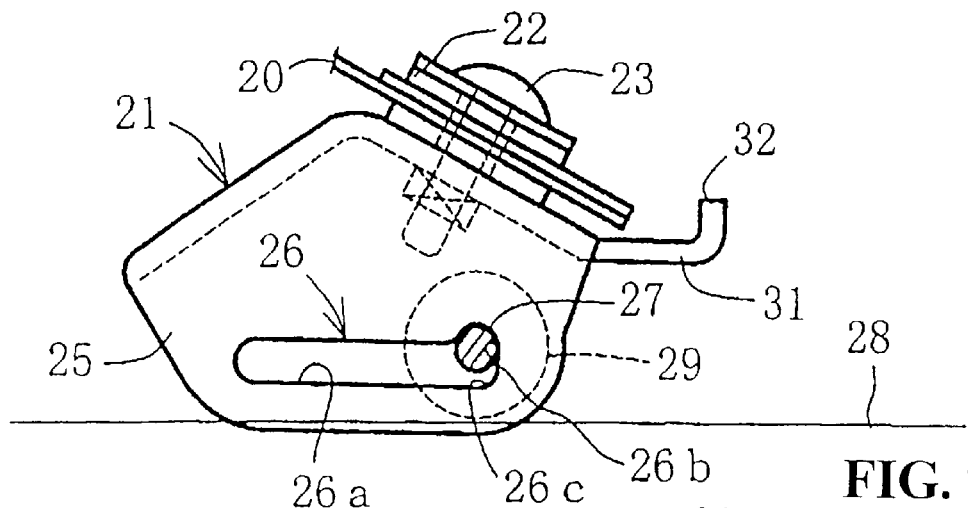
FIG. 7 is an explanatory view of the operation of the hinge.
Figure 7B:
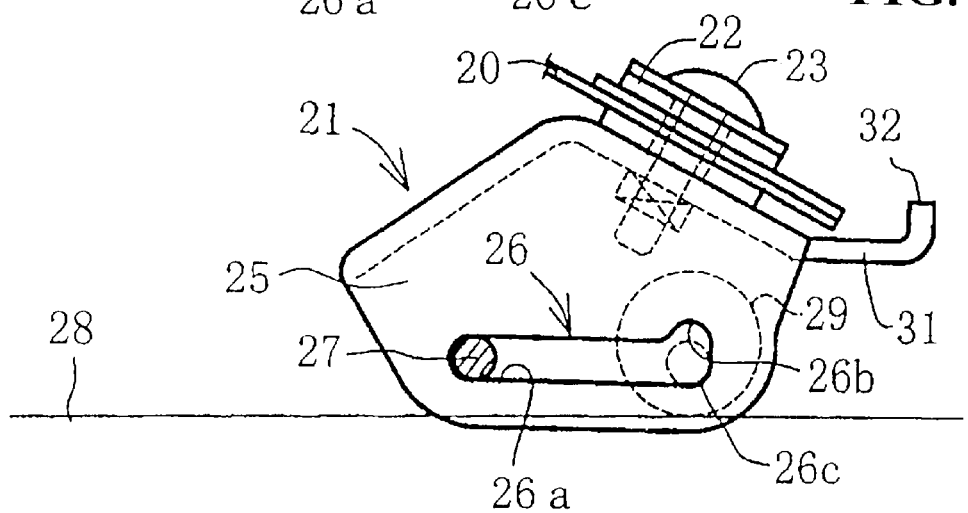

The operation of the present invention will now be described. FIG. 7(a) illustrates the state where the fuel tank is fixed. The hinge 21 is slid to the frontmost position so that the bolt 27 is positioned in the longitudinal groove part 26b. FIG. 7(b) illustrates the state where the engaging member 11 of the fuel tank escapes from the retaining member 12. When the fuel tank is pulled rearwardly, the engaging member 11 is separated from the retaining member 12 and the hinge 21 is moved rearwardly. The bolt 27 is relatively moved from the longitudinal groove part 26b through the corner part 26c into the lateral groove part 26a.

As shown in FIG. 7(b), when the bolt 27 is moved to the front end of the lateral groove part 26a, a limit of sliding in the backward direction is reached. In this position, the engaging member 11 has disengaged the retaining member 12. The length of the lateral groove part 26a corresponds to the slide amount of the fuel tank 5 necessary for engagement and disengagement of the engaging member 11 with/from the retaining member 12.

When the engaging member 11 disengages the retaining member 12, the fuel tank 5 can be rotated by lifting a front side thereof. The front portion of the fuel tank 5 is lifted slightly, and then, the fuel tank 5 is slid to the front again so as not to engage the engaging member 11 with the retaining member 12. The bolt 27 returns to the corner part 26c, as indicated by the phantom line in FIG. 7(b).

Figure 7C:
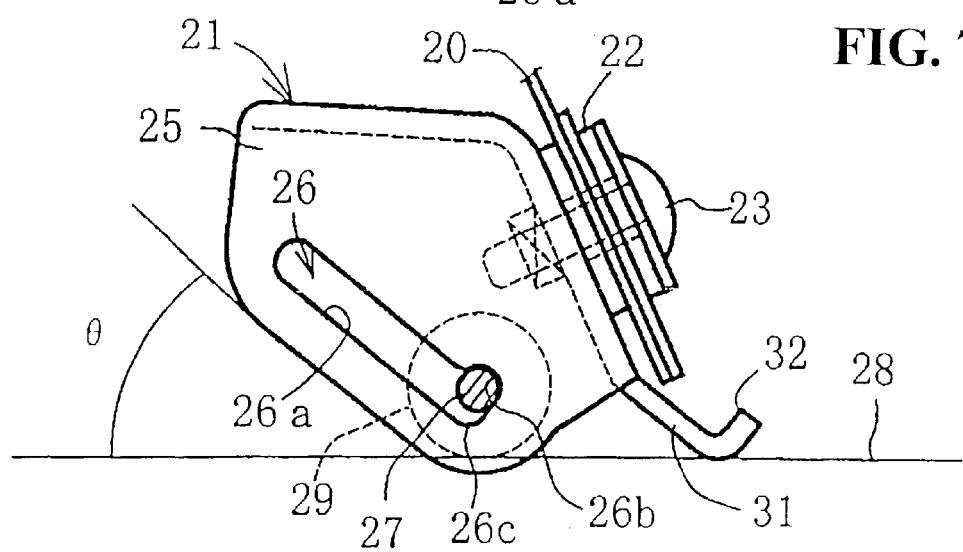

When the bolt 27 is moved to the upper end of the longitudinal groove part 26b, the bolt 27 is brought into contact with the upper end of the longitudinal groove part 26b and cannot be relatively moved further. The relative position of the bolt 27 and the hinge 21 is fixed in the sliding direction. The bolt 27 functions as a new rotating center. As shown in FIG. 7(c), the hinge 21 (and the integrated fuel tank 5) can be rotated on the bolt 27 clockwise.

Rotation of the hinge 21 is regulated by the stopper 31 and the wire cable 17 to a predetermined rotation angle θ to limit the rotation of the fuel tank. In this state, as shown in FIG. 3, a space below the fuel tank 5 is exposed and parts positioned below the fuel tank 5 can be maintained. The fuel tank 5 is fixed in reverse order.

When the fuel tank 5 is rotated in this manner, parts below the fuel tank can be maintained. The fuel tank 5 does not need to be detached and attached and parts cannot fall off and get lost. This improves maintenance of the motorcycle. Although the fuel tank 5 is rotatable, the hinge 21 corresponding to the second support part in the present invention is slideable and rotatable. The engaging member 11 corresponding to the first support part in the present invention can employ the background art engaging structure.

When a request to employ the background art engaging structure which has a long track record, is simple, convenient and versatile, and is low in cost, and the provision of a lock mechanism is limited, the present invention is advantageous, since the support part structure is simple and inexpensive.

In addition, the rotating regulation device (17 and 31) for regulating the rotating amount of the fuel tank 5 is provided. The fuel tank 5 does not need to be rotated excessively. The piping arranged below the fuel tank 5 is prevented from being affected adversely to facilitate the rotating operation.

In particular, in the present invention, the fuel pump and the throttle body 8 incorporated in the fuel tank are employed. A plurality of hoses integrally moving with the fuel tank 5 are arranged below the fuel tank 5 to prevent excessive deformation and pinching during return of the fuel tank into the engaged position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure for attaching a motorcycle fuel tank, comprising:
   first and second support parts for fixing the fuel tank to a body frame of the motorcycle, said first support part being provided at a front portion of the fuel tank, said second support part being provided at a rear portion of the fuel tank,
   wherein said first support part is of an engaging construction, engaging and disengaging the body frame by the front and rear movement of the fuel tank, and said second support part is constructed by a hinge, said hinge being slideable in the front and rear directions and rotatable in the upper and lower directions together with the fuel tank.

2. The structure for attaching a motorcycle fuel tank according to claim 1, further comprising a rotating regulation device, said rotation regulation device regulating the rotation of the fuel tank within a predetermined range.

3. The structure for attaching a motorcycle fuel tank according to claim 2, wherein said rotation regulation device includes a wire cable attached between the front portion of the fuel tank and the body frame.

4. The structure for attaching a motorcycle fuel tank according to claim 2, wherein said rotation regulation device includes a stopper attached to the rear portion of the fuel tank.

5. The structure for attaching a motorcycle fuel tank according to claim 3, wherein said rotation regulation device further includes a stopper attached to the rear portion of the fuel tank.

6. The structure for attaching a motorcycle fuel tank according to claim 1, wherein said first support part is a substantially U-shaped engaging member attached to a side surface of the front portion of the fuel tank, said substantially U-shaped engaging member being opened toward the front and engageable and disengageable with a retaining member provided on the body frame.

7. The structure for attaching a motorcycle fuel tank according to claim 6, wherein said retaining member is a circular part protruding sideward from a plate, said plate being attached between respective side surfaces of a main frame and a sub pipe of the body frame.

8. The structure for attaching a motorcycle fuel tank according to claim 1, wherein said second support part is an attaching plate integrally provided at the rear portion of the fuel tank, said attaching plate being attached to said hinge, said hinge having a substantially U-shaped cross-section opening downwardly.

9. The structure for attaching a motorcycle fuel tank according to claim 8, wherein said hinge includes right and left side plates, each of said right and left side plates being formed with a guide groove, and said hinge is attached to a collar through said guide grooves, said collar being attached to a seat rail of the body frame.

10. A structure for attaching a fuel tank to a body frame of a motorcycle, comprising:
    a first support part provided at a front portion of the fuel tank, said first support part being engageable with and disengageable from the body frame by front and rear movement of the fuel tank; and
    a second support part provided at a rear portion of the fuel tank, said second support part being slideable in front and rear directions and rotatable in upper and lower directions together with the fuel tank.

11. The structure for attaching a fuel tank according to claim 10, further comprising a rotating regulation device, said rotation regulation device regulating the rotation of the fuel tank within a predetermined range.

12. The structure for attaching a motorcycle fuel tank to a body frame of a motorcycle according to claim 11, wherein said rotation regulation device includes a wire cable attached between the front portion of the fuel tank and the body frame.

13. The structure for attaching a motorcycle fuel tank to a body frame of a motorcycle according to claim 11, wherein said rotation regulation device includes a stopper attached to the rear portion of the fuel tank.

14. The structure for attaching a motorcycle fuel tank to a body frame of a motorcycle according to claim 12, wherein said rotation regulation device further includes a stopper attached to the rear portion of the fuel tank.

15. The structure for attaching a motorcycle fuel tank to a body frame of a motorcycle according to claim 10, wherein said first support part is a substantially U-shaped engaging member attached to a side surface of the front portion of the fuel tank, said substantially U-shaped engaging member being opened toward the front and engageable and disengageable with a retaining member provided on the body frame.

16. The structure for attaching a motorcycle fuel tank to a body frame of a motorcycle according to claim 15, wherein said retaining member is a circular part protruding sideward from a plate, said plate being attached between respective side surfaces of a main frame and a sub pipe of the body frame.

17. The structure for attaching a motorcycle fuel tank to a body frame of a motorcycle according to claim 10, wherein said second support part is an attaching plate integrally provided at the rear portion of the fuel tank, said attaching plate being attached to a hinge, said hinge having a substantially U-shaped cross-section opening downwardly.

18. The structure for attaching a motorcycle fuel tank to a body frame of a motorcycle according to claim 17, wherein said hinge includes right and left side plates, each of said right and left side plates being formed with a guide groove, and said hinge is attached to a collar through said guide grooves, said collar being attached to a seat rail of the body frame.

* * * * *